June 12, 1934.  P. F. BRUINS  1,962,803
HEAT EXCHANGE APPARATUS
Filed Dec. 21, 1931  2 Sheets-Sheet 1
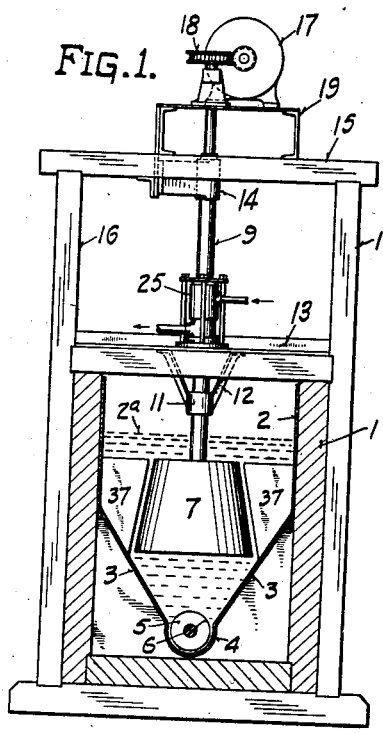
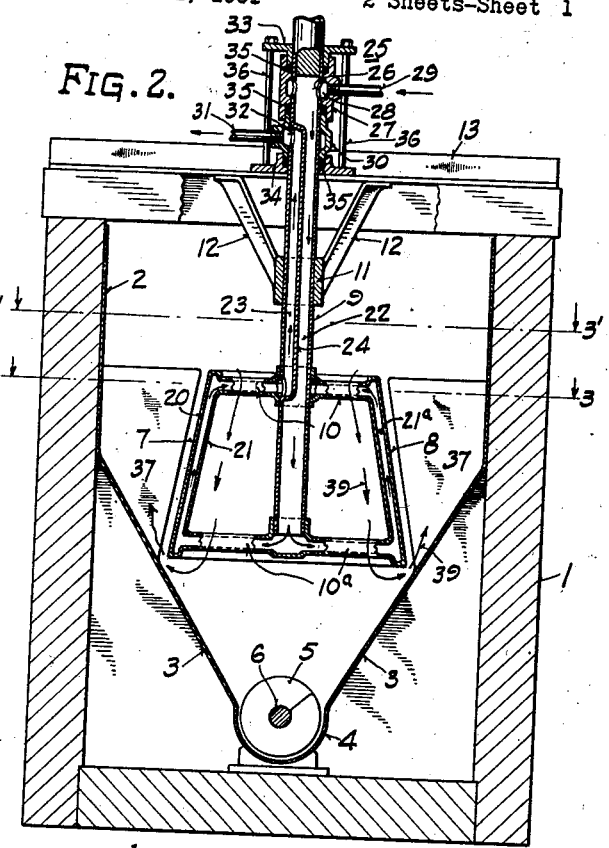
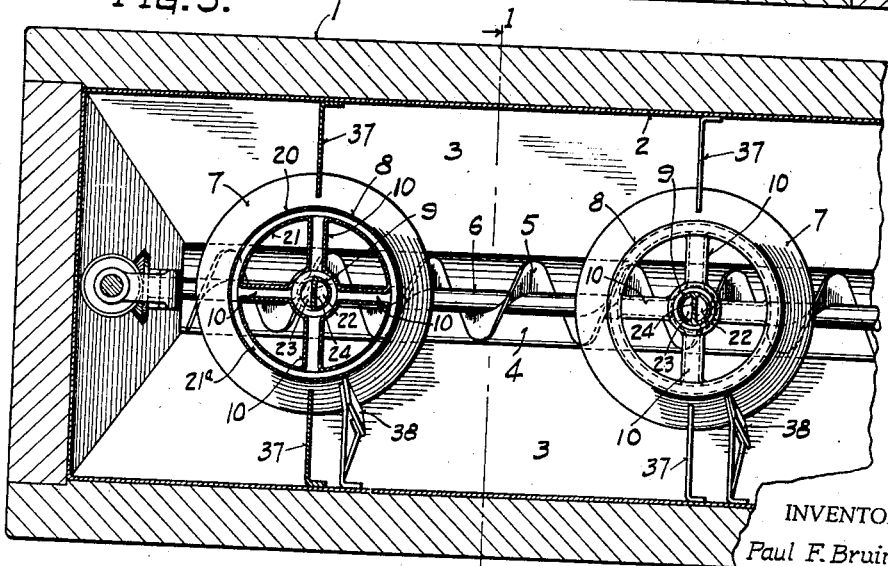
INVENTOR.
Paul F. Bruins
BY
ATTORNEY.

June 12, 1934.　　　　P. F. BRUINS　　　　1,962,803

HEAT EXCHANGE APPARATUS

Filed Dec. 21, 1931　　　2 Sheets-Sheet 2

INVENTOR.
Paul F. Bruins
BY
ATTORNEY.

Patented June 12, 1934

1,962,803

UNITED STATES PATENT OFFICE 1,962,803

HEAT EXCHANGE APPARATUS

Paul F. Bruins, Milwaukee, Wis., assignor to A. O. Smith Corporation, Milwaukee, Wis., a corporation of New York Application December 21, 1931, Serial No. 582,350

6 Claims. (Cl. 257—104)

The invention relates to heat exchange apparatus and especially to apparatus in which the heat is transferred through a solid wall and a fluid film on the wall.

In the transfer of heat through solid walls to or from fluids, a thin relatively stationary layer or film of the fluid is present on the walls. This film has a lower coefficient of heat transmission than metals, and means are desired to remove hindrances to the transfer of heat between the walls of the heat transfer elements and the materials which are being heated or cooled.

It is among the objects of the invention to provide means for reducing or eliminating the described film or layer by providing a rapidly movable heating or cooling unit.

Other objects of the invention will appear in connection with the description.

As an illustration of one embodiment of the invention, a machine for cooling and crystallizing ferrous sulphate liquor is shown in the drawings. It is to be understood that the invention may be embodied in various heating as well as cooling devices and that various modifications can be made in the illustrated embodiment without departing from the invention.

In the drawings:

Figure 1 is a view partially in elevation and partially sectional of an apparatus for cooling liquids, the partial section being taken along the line 1—1 of Fig. 3;

Fig. 2 is an enlarged fragmentary view of the apparatus as shown in Figure 1 with parts broken away to show details of construction;

Fig. 3 is a top plan view with parts in section showing a series of heat exchanger units, the unit on the left being viewed along the line 3—3 of Fig. 2, and the unit on the right being viewed along the line 3'—3' of Fig. 2.

Figure 4:
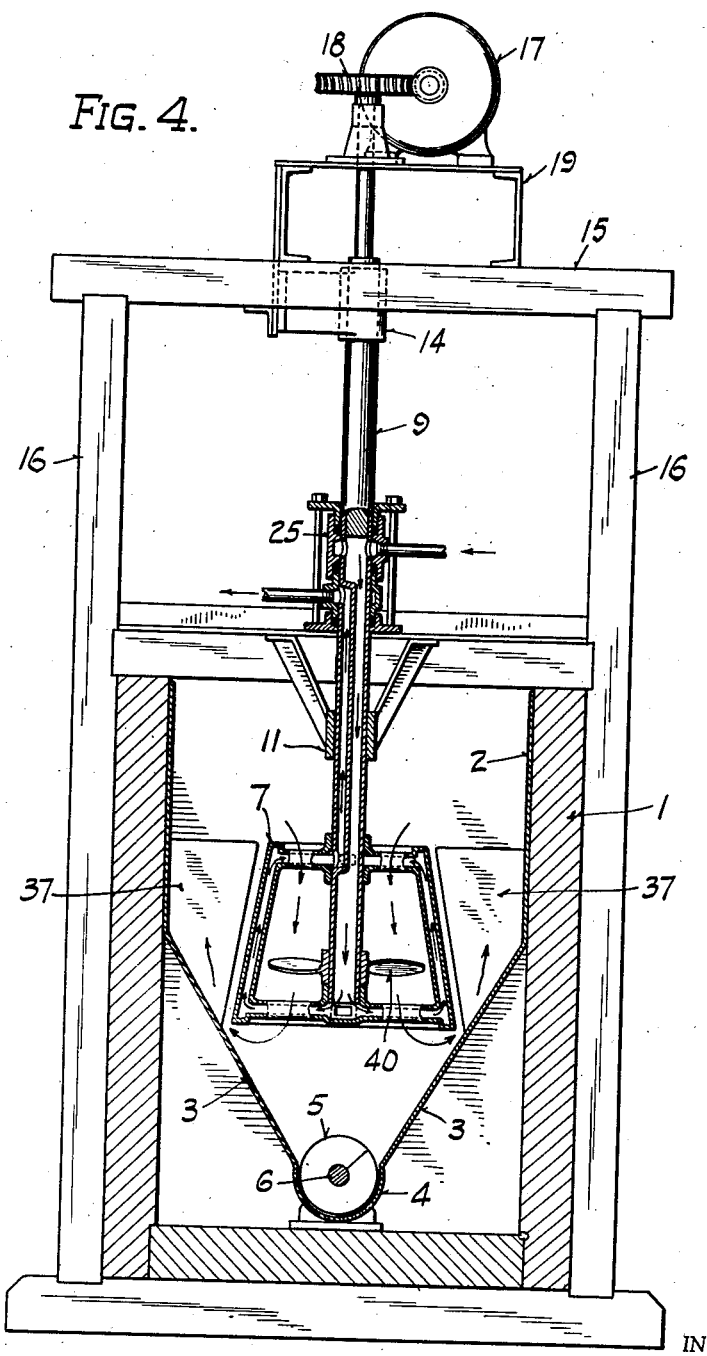
Fig. 4 is a view partly in elevation and partly in section of a modified apparatus for cooling ferrous sulphate liquor.

An elongated wooden trough 1 is used as a support and a metal tank 2 which may be composed of an acid resistant metal is set in the trough. Two of the opposite elongated side walls 3 of the tank are sloped to converge toward the bottom where they are formed into an arcuate channel 4 in which a screw conveyor 5 is mounted on the shaft 6.

A drum or tubular member 7 having a frusto-conical shape is suspended in the tank with its larger end opening downwardly. The drum comprises a shell 8 which is mounted by means of the hollow spider arms 10 and 10a on a rotatable tubular shaft 9. The spider arms 10 and 10a are arranged radially on the shaft and are attached to the top and bottom of the drum 7. The shaft 9 is rotatably mounted in guide bearings 11 suitably supported and braced by brackets 12 which are affixed to the cross member 13 on the trough 1.

As shown in Fig. 1, the upper end of the shaft 9 is mounted in a guide bearing 14 on the cross member 15 and this cross member is mounted in turn on upright members 16 which are secured to the sides of the trough 1 and extend thereabove. The shaft 9 is driven by a motor 17 through speed reduction gears 18 mounted on a box-like support 19 on the cross member 15.

Referring more particularly to Fig. 2, the shaft 9 and drum 7 are hollow to permit the circulation of a fluid, such as water. The drum 7 comprises two concentric walls 20 and 21 which are spaced to provide a chamber 21a in which a cooling fluid is circulated. The hollow supporting arms 10 and 10a communicate with the hollow shaft and with the space 21a and form passages to conduct the cooling fluid from the hollow shaft 9 through the chamber 21a.

The shaft 9 is interiorly provided with channels 22 and 23 which are separated by a partition 24. Channel 22 leads to the lower end of the shaft 9 and communicates with the lower end of chamber 21a through arms 10a. Channel 23 leads to the upper end of the drum 7 and communicates with the upper end of chamber 21a through arms 10.

The upper ends of channels 22 and 23 lead through spaced openings in the side wall of the shaft into a stuffing box 25 through which a cooling fluid may be introduced into channel 22 and discharged through channel 23. The particular construction of this stuffing box is unimportant for the purposes of this application. Any form of stuffing box which will serve the purpose of conveying the cooling fluid to and from the hollow shaft 9 without detrimental leakage can be used. In the construction shown, a series of circumferentially spaced openings 26 are formed in the hollow shaft 9 and a collar 27 having an internal annular groove 28 is placed over this series of openings. A conduit 29 leads to the collar 27 and conducts fluid into the groove 28 and channel 22. Another collar or bushing 30 is positioned about the shaft 9 and below collar 27. A conduit 31 on this collar communicates with channel 23 through another series of openings 32 in the shaft 9. These collars, or bushings, are held in place and sealed against leakage by the glands 33, 34 and packing 35. The glands 33 and 34 are held tightly against the packing 35 by bolts 36.

Baffles 37 are mounted on the inner walls of the container 2 and positioned opposite the walls of the drum 7, leaving about ¼ inch clearance between the drum and the baffles. The baffles prevent swirling of the liquid and cause the liquid flowing upward on the outside of the drum to move in a direction which is transverse to the movement of the walls of the drum. A scraper 38, as shown in Fig. 3, may also be supported on the side walls and positioned to brush against the surface of the drum at points removed from the baffles 37 for cleaning the surface of the drum. The scraper may be omitted where cleaning is unnecessary.

In the operation of the described apparatus as a cooler for cooling and crystallizing ferrous sulphate from spent pickle liquor, the liquor 2a is placed in the trough 1 in sufficient amount to submerge the drum 7, say 4 to 6 inches. The drum is rotated by means of motor 17 which drives the shaft 9 through gears 18. Cool water at a temperature of about 68° F. is introduced through conduit 29, channel 22 of the shaft 9, hollow arms 10a to the lower end of chamber 21a in drum 7. The water passes upwardly through the chamber 21a, through hollow arms 10 into channel 23, and finally through shaft 9 and conduit 31. The water may be passed through a conduit 31 of other similar units to cool the same, or it may be conducted away and used for other purposes.

The rotation of drum 7 tends to cause the fluid 2a in the tank 1 to rotate with the result that the relative velocity of the surface of the drum with respect to the fluid 2a is materially decreased. Baffles 37 effectively prevent this rotation of fluid 2a. When used to treat liquids which form deposits on the drum, such as gases, crystals, scale or the like, the scraper 38 efficiently keeps the surface of the drum 7 clean and prevents a lowering of the rate of heat exchange from this cause.

The drum tends to carry the liquid film on its surface when it is moved, but since the film is relatively less tenacious as the distance from the drum increases, the lack of rotation of the body of liquid has an eroding action on the film and decreases the thickness of the film. Rapid speeds produce thinner films and higher rates of heat transfer than slower speeds.

This rotation of the drum also causes the liquor within the tank to circulate downwardly within the drum—that is, in the direction of its axis and toward its larger end—and upwardly without the drum as shown by arrows 39 in Fig. 2. This circulation is due to the rotation and the shape of the drum. The rotation causes the fluid film which is adherent to the drum to rotate therewith. As a result, centrifugal forces are set up which act on each particle of this rotating film tending to move it radially outward. Due to the increasing diameter of the drum, these forces set up differential pressures which are effective to move the particles downwardly along its surface. The precise theory upon which this circulation is based is immaterial for the present purposes. This circulating movement of liquor brings fresh untreated liquor to the heating or cooling surface, and the flow of liquid over the surfaces of the drum is beneficial in decreasing the liquid film and increasing the heat transferring capacity of the drum.

An erosive action is produced on the film which is on the chamber walls of the drum by the circulation of fluid which is produced by the rotation of the drum. This action beneficially affects the transfer of heat in addition to the breaking down of the film which takes place by reason of the forced circulation of the heat exchange medium through the passages in the drum. Thus the rotation of this frusto-conical drum has two distinct effects: one being the erosion of the fluid film on the surface of the drum and the other being the circulation of the fluid in which the drum is submerged. These two effects cooperate to produce an efficient heat transference.

The cooling of the spent pickle liquor crystallizes some of the iron sulphate therein. As the crystals settle and collect in the groove 4, the screw conveyor 5 carries them to the end of the trough where they may be removed by any convenient means.

Excellent results are obtained by employing peripheral velocities of 10 to 20 feet per second. Velocities higher than these can be used but the peripheral velocity of the drum should not be much less than 5 feet per second. The velocity below which the erosion of the fluid film is not produced to an appreciable degree by the rotation of the heated or cooled element, or drum, varies somewhat with the properties of the fluid. The invention contemplates the operation of the drum at such a speed of rotation that, taking into consideration the properties of the fluid, a substantial erosion or destruction of this stagnant film is produced. The terms "high speed", "high peripheral velocities" and "high velocities" in the specification and claims refer to speeds which produce a substantial erosion of the film.

Various modifications in the form and disposition of the self-pumping heat transfer element can be made. I do not limit my invention to the specific form which has been described or to disposing a frusto-conical tubular element with the small end uppermost since the tubular walls may slope outwardly toward the top or cylindrical walls can be used. The walls of the drum may be variously ribbed or corrugated to give circulation and movement to the liquor and a propelling means may be mounted in the drum to produce or augment the circulation of liquor. A heat exchange device with a propeller 40 mounted within the drum is shown in Fig. 4. The propeller may be used in a cylindrical drum to produce circulation of the liquid, or it may be used as shown in Fig. 4, to augment the circulation produced by a frusto-conical drum. In the specification and claims the term, sloping wall refers to a wall which slopes with respect to the axis of the drum, or tubular member, and its elements may be straight lines or curves. The invention may be embodied in various heat exchange devices for heating or cooling gases or liquids, and the material to be treated may be that which is contained in the tank and/or that which is passed through the passages in the walls of the drum.

With this type of heat transfer unit, high relative velocities between the unit and the body of the fluid in which the unit is immersed can be had without swirling, splashing, or noticeably disturbing the surface of the fluid.

I claim:

1. A heat exchange apparatus which comprises a fluid container; a heat conducting drum having both ends open positioned in said container, said drum having the shape of a frustum of a cone; means for controlling the temperature of said drum; and means for rapidly rotating said drum about its axis.

2. A heat exchange device which comprises a tubular member having a passageway in its walls for conducting a heat exchange medium therethrough and having openings in the ends of the member, means for rotating the member in a material in which it is adapted and arranged to be immersed, and propelling means mounted within the tubular member for circulating the material through the tubular member.

3. A heat exchange device which comprises a container for liquid, a frusto-conical drum with outer and inner walls which is open at the ends and disposed in the liquid space with its larger end down, the outer and inner walls of the drum being spaced apart to provide passage for a heat exchange medium, means for rotating the drum, and means for supplying a heat exchange medium to said passage while the drum is in rotation.

4. A heat exchange device which comprises a container for liquid, a frusto-conical drum disposed in the liquid space with its larger end down, a shaft on the drum for rotating the same, said shaft having a conduit for supplying a heat exchange medium and a conduit for discharging the same, and spaced walls in the drum providing passage therethrough between the ends of said conduits.

5. A heat exchange device which comprises a container for liquid, a frusto-conical drum disposed in the liquid space with its larger end down, a rotatable shaft for suspending and rotating the drum on its axis, said shaft having a conduit for supplying a heat exchange medium and a conduit for discharging the same, and spaced walls in the drum providing passage therethrough between the ends of said conduits.

6. A heat exchange device which comprises a tank for liquid, an open-ended frusto-conical drum suspended within the tank with its axis vertical and its larger end lowermost, said drum having passages in its walls to conduct a heat exchange medium therethrough, means for conducting a cooling medium to one end of said passages, means for rapidly rotating the drum and for suspending the drum submerged in said liquid.

PAUL F. BRUINS.